United States Patent [19]

Joubert et al.

[11] Patent Number: 4,832,862
[45] Date of Patent: May 23, 1989

[54] COMPOSITE DETERGENT PARTICULATES

[75] Inventors: Daniel Joubert, Trevoux; Philippe Parker, Villeurbanne, both of France

[73] Assignee: Rhone-Poulenc Chimie, Courbevoie, France

[21] Appl. No.: 54,870

[22] Filed: May 27, 1987

[30] Foreign Application Priority Data

May 27, 1986 [FR] France ................. 86 07764

[51] Int. Cl.$^4$ ................. C11D 3/04; C11D 3/08/7/00
[52] U.S. Cl. ................. 252/135; 252/174.15; 252/174.13; 252/385; 252/313.2; 252/140; 23/313 R; 23/313 AS; 427/215; 427/219; 428/404
[58] Field of Search ................. 252/174.15, 174.13, 252/135, 385, 313.2, 140; 23/313 R, 313 AS; 427/215, 219; 428/404

[56] References Cited

U.S. PATENT DOCUMENTS

| | | | |
|---|---|---|---|
| 1,562,821 | 11/1925 | Bunds | 427/215 |
| 2,131,718 | 9/1938 | McDaniel | 23/302 R |
| 2,202,002 | 5/1940 | Harshberger | 428/404 |
| 2,895,916 | 7/1959 | Midenkevich et al. | 252/99 |
| 2,913,419 | 11/1959 | Alexander | 252/313 |
| 3,208,822 | 9/1965 | Baker et al. | 23/313 AS |
| 3,247,118 | 4/1966 | Matthaei | 252/99 |
| 3,257,325 | 6/1966 | Koster et al. | 252/135 |
| 3,346,335 | 10/1967 | Schnurch et al. | 423/332 |
| 3,503,790 | 3/1970 | Gringras | 427/185 |
| 3,579,299 | 5/1971 | Sams et al. | 423/332 |
| 3,625,902 | 12/1971 | Sumner | 252/99 |
| 3,687,640 | 8/1972 | Sams et al. | 23/313 |
| 3,753,929 | 8/1973 | Lindsley | 502/65 |
| 3,783,008 | 1/1974 | Weides | 427/215 |
| 3,817,776 | 6/1974 | Gringras | 117/100 S |
| 3,868,227 | 2/1975 | Gericke et al. | 23/313 |
| 3,922,392 | 11/1975 | Kohlschutter et al. | 427/215 |
| 3,931,036 | 1/1976 | Pierce | 252/135 |
| 3,932,140 | 1/1976 | Jayawant et al. | 23/293 A |
| 3,950,275 | 4/1976 | Toyoda et al. | 252/527 |
| 3,951,838 | 4/1976 | Jayawant et al. | 252/99 |
| 3,989,635 | 11/1976 | Toyoda et al. | 252/135 |
| 3,996,399 | 12/1976 | Vrisakis | 427/215 |
| 4,077,897 | 3/1978 | Gault | 252/99 |
| 4,089,795 | 5/1978 | Bailey et al. | 252/135 |
| 4,182,683 | 1/1980 | Irvine et al. | 252/99 |
| 4,207,197 | 6/1980 | Davis et al. | 252/99 |
| 4,253,849 | 3/1981 | Vrisakis et al. | 23/313 AS |
| 4,289,643 | 9/1981 | Joubert | 252/103 |
| 4,370,250 | 1/1983 | Joshi | 252/135 |
| 4,452,909 | 6/1984 | Yang | 502/69 |
| 4,477,492 | 10/1984 | Bergua et al. | 427/215 |
| 4,518,516 | 5/1985 | Godard et al. | 252/91 |
| 4,601,844 | 7/1986 | Cilley | 252/95 |

FOREIGN PATENT DOCUMENTS 941689 2/1974 Canada.
2913035 10/1980 Fed. Rep. of Germany.
908803 10/1962 United Kingdom.

Primary Examiner—Paul Lieberman
Assistant Examiner—Ronald A. Krasnow
Attorney, Agent, or Firm—Finnegan, Henderson, Farabow, Garrett, & Dunner

[57] ABSTRACT

Silicate/silica composite particulates, well adapted for detergency applications, e.g., in detergent formulations for automatic dishwashers, comprise granules having an average molar ratio $SiO_2/Na_2O$ of from 1.2 to 2.6, a metasilicate core and an enveloping silica outer sheath therefor.

18 Claims, 1 Drawing Sheet

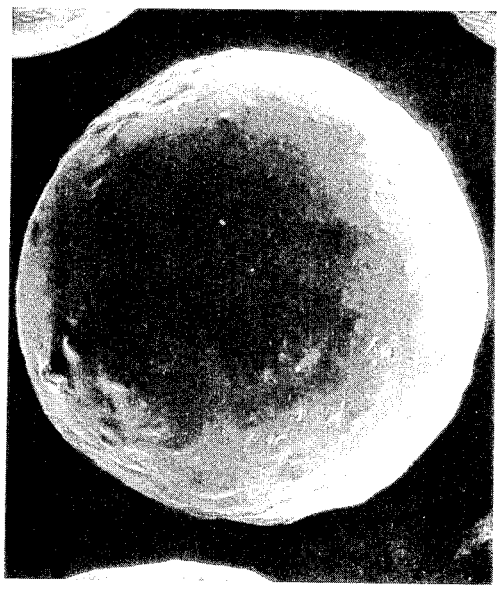

COMPOSITE DETERGENT PARTICULATES

BACKGROUND OF THE INVENTION

1. Field of the Invention

The present invention relates to novel granules or particulates comprised of silicate and silica, to a process for the production of such novel granules and to the use thereof in washing operations, and, more especially, to the use thereof in detergent compositions for automatic dishwashers.

2. Description of the Prior Art

Silicates, and especially metasilicate, are materials commonly used in detergent compositions for dishwashers; in fact, they impart the alkalinity required for washing dirty cooking utensils. In return, this alkalinity required for detergency applications presents safety problems. Indeed, detergent powders for dishwashers are in common domestic use and are often within the reach of children who are unaware of the hazards thereof and sometimes have a tendency to ingest them. The use of detergent powders which have a much lower alkalinity has also been sought for the past few years in order to ensure a greater safety to the user and to the population as a whole.

In addition to this safety requirement, silicates, and especially metasilicate, must meet other essential requirements, which often cannot be achieved in a simple manner. Thus, the silicate which constitutes an essential fraction of the detergent powder for dishwashers must be impeccable in appearance because, for detergency/washing applications, appearance often has a significant affect on marketability. The silicate grains must have a high degree of whiteness, a spherical shape and a uniform particle size such as to avoid sedimentation problems in the powder drum.

Other than these features relating to appearance, detergent compositions for dishwashers must be in concentrated form and, therefore, must consist of raw materials which have a high specific weight because the distribution magazines incorporated into dishwashers are typically of small size.

In addition to being concentrated, the raw materials must have a good stability during storage. Detergent compositions are sometimes stored for relatively long periods, under conditions of humidity and temperature which are often highly variable. Therefore, it is essential that after being stored for such time periods, the detergent composition remains in the form of a fluid powder, preferably free from agglomerates caused by caking phenomena. Above and beyond this physical stability, the detergent powder must be chemically stable. Thus, as a result of variations in humidity, the silicate must not degrade the more unstable constituents of the composition, such as perfumes, chlorinated salts and nonionic surfactants, such as polyoxyethylene glycols.

The totality of the aforesaid constraints, which are not always concordant, result in the fact that the ideal silicate is a sophisticated product, the production of which presents more and more complicated research problems. And in light of modern increasingly severe safety standards, priority will be given to decreasing alkalinity while at the same time avoiding deterioration in the other properties: whiteness, particle size, spherical shape, density and compatibility.

To date silicates used in detergent compositions for dishwashers are almost exclusively metasilicates, i.e., silicates in which the molar ratio $SiO_2/Na_2O$ is equal to 1. This silicate is the most efficient because it has the highest alkalinity. From a chemical point of view, this metasilicate may be in the anhydrous form, the apparent density of which is very high, or in the form of the pentahydrate, the apparent density of which is lower. Nevertheless, both are caustic. A metasilicate granule having an anhydrous center or core, and a hydrated enveloping sheath or periphery has also been proposed to this art, in European Patent No. EP 100,700, but, like the metasilicates mentioned above, such granule does not have the properties of safety currently demanded by the market.

The preparation of a silicate of much lower alkalinity, and which is much less caustic in nature because it has a chemical composition in which the molar ratio $SiO_2/Na_2O$ is in the vicinity of 2, is described in U.S. Pat. No. 3,687,640. This compound is aspherical in shape and has a density of approximately 0.8, which renders it insufficiently concentrated for use as a detergent. Moreover, it still has a high surface alkalinity, although it is lower than that of metasilicate. Furthermore, the process for the preparation of such silicate is difficult to carry out.

SUMMARY OF THE INVENTION

Accordingly, a major object of the present invention is the provision of an improved silicate having an alkalinity which is minimal and essentially negligible, spherical in shape, and which is further characterized by a whiteness and density such that it is well adapted for use in detergent compositions for dishwasher applications. Briefly, the novel silicate according to the present invention has an average molar ratio $SiO_2/Na_2O$ ranging from 1.2 to 2.6 and comprises a metasilicate core and an enveloping sheath, or outer layer, comprised, at least in part, of silica.

DETAILED DESCRIPTION OF THE PREFERRED EMBODIMENTS OF THE INVENTION

More particularly according to the present invention, the subject composite silicate preferably has an average molar ratio $SiO_2/Na_2O$ ranging from 1.2 to 2.2.

It preferably has a density ranging from 0.85 to 1.2, which is greater than that of the silicate granules of the prior art having a $SiO_2/Na_2O$ ratio of 2 (U.S. Pat. No. 3,687,640).

The water content, calculated by weight relative to the silicate in the said granules, preferably ranges from 20 to 40%.

For a more satisfactory use in detergent compositions, a particle size of from 0.3 mm to 1.8 mm is preferred for the silicates according to the invention. The mean diameter of the granules of the invention is advantageously approximately 0.8 mm, although this value is not critical; it is preferred simply because the other constituents of the detergent composition already have this particle size. The granules of the present invention have the following properties:

(i) Much lower surface alkalinity;
(ii) High density, approximately 1 on average;
(iii) Very good stability in a warm atmosphere, as well as in a humid atmosphere;
(iv) Very high compatibility with chlorinated salts, surfactants, perfumes and natural materials which are sensitive to very alkaline pH (enzymes); and
(v) Very high resistance to attrition.

The structure of the silicate/silica composite particulates of this invention especially results from the following preparative technique and using the following raw materials:

Granules of metasilicate pentahydrate, optionally mixed with anhydrous metasilicate, and silica are advantageously used as the raw materials.

The metasilicate pentahydrate may be of widely diverse origins. However, the use of a granular metasilicate pentahydrate which has a particle size ranging from 0.2 to 1.6 mm is preferred.

The metasilicate pentahydrate marketed by Rhone-Poulenc under the trademark Simet 5G is particularly preferred.

The anhydrous metasilicate optionally employed is a powdery compound, the particle size of which is less than 0.6 mm. The anhydrous metasilicate marketed by Rhone-Poulenc under the trademark Simet AP is particularly preferred.

The silica is preferably a precipitated silica in the powdery form, the particle size of which is less than 0.075 mm. The precipitated silica marketed by Rhone-Poulenc under the trademark Tix-O-Sil 38 A is particularly preferred.

The process for the preparation of silicate granules which have a molar ratio $SiO_2/Na_2O$ of from 1.2 to 2.6 is characterized in that, in a first stage, a thermal granulation is carried out by contacting the granules of metasilicate pentahydrate, optionally mixed with anhydrous metasilicate, with silica at a temperature of from 60° to 75° C. and in that, in a second stage, the mixture is cooled and then matured or aged for such period of time as to permit a quantity of water of from 20 to 40% by weight to remain within the granule and to effect adhesion of silica to the surface and its partial conversion into a silicate having a molar ratio $SiO_2/Na_2O$ greater than 2.

The first stage of the said process is carried out by contacting the aforesaid raw materials with each other in a conventional apparatus for mixing powders, such as rotary drum, granulating plate, fluidized bed or powder mixers of the Lödige, Vidax or Spangenberg type. However, the use of a rotary drum is preferred.

Quantities of powder easily determined by those skilled in this art in accordance with the molar ratio desired for the resultant silicate are introduced into the mixer. The powder mixer is then heated by any means, but preferably by a radiant heater, especially by infrared or microwave radiation. The radiation heater is preferably installed perpendicular to the wall of the mixer.

A relative humidity which corresponds to that of the vapor pressure of metasilicate pentahydrate at its melting point, i.e., a relative humidity expressed as water pressure greater than $2.10^4$ Pascal, is maintained within the reactor.

The heating is preferably continued for 20 to 60 seconds from the time when the powder mass reaches the desired temperature.

The second stage of the process according to the invention comprises ensuring maturing of the mixture previously obtained, after cooling.

If the maturing or aging, is carried out at a temperature of from 10° to 30° C. in the presence of a relative humidity ranging from the humidity corresponding to the vapor pressure of metasilicate pentahydrate to that corresponding to the vapor pressure of metasilicate hexahydrate, the novel granules of the present invention are conveniently obtained.

The same elements of apparatus as those used for the granulation, and preferably the fluidized bed, are used as the apparatus for maturing.

This maturing is preferably carried out for a period of 5 to 15 minutes when a fluidized bed is used, and 5 to 30 minutes when a rotary drum is used as the aging apparatus.

If the maturing is carried out at a higher temperature and for a longer period of time (for example, approximately one hour) the water from the metasilicate pentahydrate has the tendency to migrate and to convert the surface layer of silica into a high ratio silicate.

All of the materials produced by the present process have a lower surface alkalinity relative to metasilicates, and even relative to silicates which have the said overall ratio, but are obtained by another process.

These silicates have a high compatibility with chlorinated salts or with enzymes and they are well suited for use in detergent compositions for dishwashers.

The physicochemical properties of the granules of the invention are determined by the following tests:

(1) Apparent density

This is determined by a procedure similar to that according to the standard NF T-73-405 which enables the apparent density of washing powders to be determined.

The volume of a given mass of the product to be tested is determined in a graduated cylinder, after permitting the product to drop freely and without compressing same.

Two determinations are carried out per product.

(2) Water content

Water content is determined by weighing the product which has been calcined at 550° C.

(3) Rate of dissolution

Dissolution rate is determined by monitoring the conductivity of the solution during the dissolution of 17.5 g of the product in 500 ml of water.

The dissolution time is given by the abscissa at the starting point of the conductivity plateau. The time is expressed in seconds.

(4) Dust formation

The granules of the invention are spherical beads (see FIGURE of Drawing) having a very smooth surface appearance and the granules do not form dust.

(5) Surface alkalinity

A depth of approximately 0.5 mm of a colored indicator solution, such as phenolphthalein (0.05 g of phenolphthalein + 50 ml of ethanol + 50 ml of water), is introduced into a crystallization vessel.

The grains of the final product are dropped therein. In the case of a silicate having a $SiO_2/Na_2O$ ratio of 2, as in U.S. Pat. No. 3,687,640, an instantaneous color change of the granule to red is observed.

The surface alkalinity therefore is characterized by a pH greater than 10.

In the case of the granules according to the invention, having a $SiO_2/Na_2O$ ratio=2, no instantaneous color change to red is observed. The surface alkalinity therefore is characterized by a pH less than 10. The surface alkalinity of the subject granules is therefore less than that of the granules of the prior art.

(6) Behavior in solution

The dissolution of these granules causes the metasilicate to be attacked by the silica and a solution of silicate having a $SiO_2/Na_2O$ ratio equal to the overall ratio of the granule is ultimately obtained.

This attack may be monitored by:
(i) pH determinations;
(ii) Conductimetry; and
(iii) Turbidimetry.

In order to further illustrate the present invention and the advantages thereof, the following specific examples are given, it being understood that same are intended only as illustrative and in nowise limitative.

EXAMPLE 1

The following raw materials were introduced into a mixing apparatus consisting of a rotary drum:
(i) 1,270 g of metasilicate Simet® 5G;
(ii) 144 g of silica Tix-O-Sil® 38A.

The masses were calculated such as to provide a granule having a $SiO_2/Na_2O$ ratio by weight of 2.0.

The mixer was rotated and heated by supplying warm air to the outer wall.

The air within the mixer was maintained at a relative humidity, expressed as water pressure, greater than $2.10^4$ Pascal.

When the temperature of the products reached 68° C., a very quick bonding of the silica to the metasilicate pentahydrate was observed.

The heating was discontinued and the product composite granules were allowed to mature for 30 min. in the rotating mixer, at ambient temperature.

Product No. 1 was produced.

EXAMPLE 2

Example 1 was repeated, introducing:
(i) 1,270 g of metasilicate Simet® 5G;
(ii) 206 g of silica Tix-O-Sil® 38 A.

A granule having an $SiO_2/Na_2O$ gravimetric ratio of 1.5 was produced.

The mixer was heated using a row of infrared lamps installed within the drum.

When the temperature of the products reached 75° C., the bonding of the silica onto the metasilicate pentahydrate was observed.

The procedure was then continued as in Example 1.

EXAMPLE 3

Example 1 was repeated, introducing the following materials into a granulating plate:
(i) 1,270 g of metasilicate Simet® 5G;
(ii) 127 g of silica Tix-O-Sil® 38A.

A granule having a gravimetric ratio $SiO_2/Na_2O$ of 1.31 was produced.

The granulating plate was heated using a row of infrared lamps.

When the temperature of the products reached 71° C., the bonding of the silica to the metasilicate pentahydrate was observed.

The maturing of the granules was for 15 minutes at ambient temperature.

EXAMPLE 4

Example 1 was repeated, introducing:
(i) 1,000 g of metasilicate Simet® 5G;
(ii) 215 g of metasilicate Simet® AP;
(iii) 444 g of silica Tix-O-Sil® 38 A.

A granule having a gravimetric ratio $SiO_2/Na_2O$ of 2.0 was produced.

When the temperature reached 82° C., the bonding of the silica to the metasilicate was observed.

The maturing was carried out as in Example 1.

EXAMPLE 5

Example 1 was repeated, introducing:
(i) 1,400 g of metasilicate Simet® 5G;
(ii) 90.4 g of silica Tix-O-Sil® 38 A.

A granule having a gravimetric ratio $SiO_2/Na_2O$ of 1.2 was produced.

When the temperature of the products reached 75° C., the rapid bonding of the silica to the metasilicate was observed.

The maturing was carried out as in Example 1.

EXAMPLE 6

Example 1 was repeated, introducing:
(i) 1,270 g of metasilicate Simet® 5G;
(ii) 537 g of silica Tix-O-Sil® 38 A.

A granule having a gravimetric ratio $SiO_2/Na_2O$ of 2.3 was produced.

When the temperature of the products reached 70° C., the bonding of the silica to the metasilicate was observed.

The maturing of the granule was carried out as in Example 1.

EXAMPLE 7

Example 1 was repeated, introducing:
(i) 1,270 g of metasilicate Simet® 5G;
(ii) 444 g of silica Tix-O-Sil® 38 A.

A granule having a gravimetric ratio $SiO_2/Na_2O$ of 2.0 was produced.

When the temperature of the products reached 72° C., the bonding of the silica was observed.

The maturing of the granule was carried out for 4 hours at 52° C.

EXAMPLE 8

Example 1 was repeated, introducing the following materials into a granulating plate:
(i) 1,270 g of metasilicate Simet® 5G;
(ii) 444 g of silica Tix-O-Sil® 38 A.

A granule having a gravimetric ratio $SiO_2/Na_2O$ of 2.0 was produced.

The granulating plate was heated with a row of infrared lamps.

When the temperature of the products reached 74° C., the bonding of the silica to the metasilicate was observed.

The maturing was carried out for 2 hours at 50° C.

The results of the foregoing examples are reported in the Table which follows:

TABLE

| EXAMPLE | 1 | 2 | 3 | 4 | 5 | 6 | 7 | 8 |
| --- | --- | --- | --- | --- | --- | --- | --- | --- |
| $R_g$ of the granule | 2.0 | 1.5 | 1.31 | 2.0 | 1.2 | 2.3 | 2.0 | 2.0 |
| Granulator | Drum | D | Plate | D | D | D | D | P |
| Granulation temperature (°C.) | 68.5 | 75 | 71 | 82 | 75 | 70 | 72 | 74 |
| Maturing/drying | M | M | M | M | M | M | D | D |
| Loss at | 32.1 | 36.9 | 37.9 | 36.2 | 39.3 | 34.7 | 27.2 | 24.2 |

TABLE-continued

| EXAMPLE | 1 | 2 | 3 | 4 | 5 | 6 | 7 | 8 |
|---|---|---|---|---|---|---|---|---|
| 550° C. (%) | | | | | | | | |
| Dissolution rate(s) | 90 | 85 | 85 | 100 | 60 | 120 | 150 | 168 |
| Density | 1.02 | 1.04 | 0.99 | 1.02 | 1.02 | 1.00 | 1.00 | 0.97 |

$R_g$ = gravimetric ratio $SiO_2/Na_2O$

While the invention has been described in terms of various preferred embodiments, the skilled artisan will appreciate that various modifications, substitutions, omissions, and changes may be made without departing from the spirit thereof. Accordingly it is intended that the scope of the present invention be limited solely by the scope of the following claims, including equivalents thereof.

What is claimed is:

1. Composite particulates useful as detergents, comprising granules having an average molar ratio of $SiO_2/Na_2O$ ranging from 1.2 to 2.6, a metasilicate central core body and an outer sheath therefor, said sheath being formed from silica and said granules being water-soluble.

2. The composite particulates as defined by claim 1, having an average molar ratio $SiO_2/Na_2O$ of from 1.2 to 2.2.

3. The composite particulates as defined by claim 1, having a density of from 0.85 to 1.2.

4. The composite particulates as defined by claim 1, having a water content of from 20 to 40%, calculated by weight relative to the silicate.

5. The particulates as defined by claim 1, having particle sizes of from 0.3 mm to 1.8 mm.

6. A process for the preparation of the composite particulates as defined by claim 1, comprising co-granulating silica with metasilicate pentahydrate granules, optionally in admixture with anhydrous metasilicate.

7. The process as defined by claim 6, wherein the metasilicate pentahydrate has an average particle size of from 0.2 to 1.6 mm.

8. The process as defined by claim 6, wherein the anhydrous metasilicate has an average particle size of less than 0.6 mm.

9. The process as defined by claim 6, Wherein the silica comprises precipitated silica, the particle size of which is less than 0.075 mm.

10. The process as defined by claim 6, comprising, in a first stage, contacting granules of metasilicate pentahydrate, optionally admixed with anhydrous metasilicate, with silica, at a temperature of from 60° to 75° C., to thermally granulate same, and thereafter, in a second stage, aging the resulting particulates such that from 20 to 40% of water remains therein, silica is adhered to the surface thereof, and, if necessary, said silica is partially converted into silicate having a $SiO_2/Na_2O$ ratio greater than 2.

11. The process as defined by claim 10 wherein the first stage is carried out in a rotary drum.

12. The process as defined by claim 10 wherein the first stage, the temperature is adjusted with infrared or microwave radiation.

13. The process as defined by claim 10, wherein the first stage, a relative humidity corresponding to that of the vapor pressure of metasilicate pentahydrate at its melting point is maintained.

14. The process as defined by claim 10, wherein the aging is carried out at a temperature of from 10° to 30° C.

15. The process as defined by claim 10, wherein the aging is carried out at a relative humidity corresponding to a relative humidity ranging from the vapor pressure of metasilicate pentahydrate to that of metasilicate hexahydrate.

16. The detergent composition as defined by claim 1, further including a surfactant.

17. In a washing process wherein a soiled item is contacted with an aqueous solution of a detergent composition, the improvement which comprises utilizing therefor the detergent composition as defined by claim 1.

18. The composite particulates as defined by claim 1, having a percentage of the surface of said metasilicate central core body coated by said outer sheath, said percentage being sufficient to provide said particulate with a surface alkalinity of less than pH 10.

* * * * *